(12) United States Patent
Duelli

(10) Patent No.: US 8,304,994 B2
(45) Date of Patent: Nov. 6, 2012

(54) LIGHT COLLECTION SYSTEM FOR AN ELECTRODELESS RF PLASMA LAMP

(75) Inventor: Markus Duelli, Seattle, WA (US)

(73) Assignee: Luxim Corporation, Sunnyvale, CA (US)

( * ) Notice: Subject to any disclaimer, the term of this patent is extended or adjusted under 35 U.S.C. 154(b) by 594 days.

(21) Appl. No.: 12/576,905

(22) Filed: Oct. 9, 2009

(65) Prior Publication Data

US 2010/0123407 A1    May 20, 2010

Related U.S. Application Data

(60) Provisional application No. 61/104,021, filed on Oct. 9, 2008.

(51) Int. Cl.
*H05B 41/24* (2006.01)
*H01J 1/62* (2006.01)

(52) U.S. Cl. ............... 315/111.21; 315/248; 315/39; 313/512; 313/110; 313/112

(58) Field of Classification Search ......... 315/111.21, 315/39, 248, 34; 313/317, 231.31, 231.01, 313/231.41, 231.51, 634, 512, 110, 112, 313/313, 311
See application file for complete search history.

(56) References Cited

U.S. PATENT DOCUMENTS

| | | | |
|---|---|---|---|
| 3,787,705 A | 1/1974 | Bolin et al. | |
| 3,826,950 A | 7/1974 | Hruda et al. | |
| 4,001,631 A | 1/1977 | McNeill et al. | |
| 4,206,387 A | 6/1980 | Kramer et al. | |
| 4,485,332 A | 11/1984 | Ury et al. | |
| 4,498,029 A | 2/1985 | Yoshizawa et al. | |
| 4,633,140 A | 12/1986 | Lynch et al. | |
| 4,749,915 A | 6/1988 | Lynch et al. | |
| 4,795,658 A | 1/1989 | Kano et al. | |
| 4,887,192 A | 12/1989 | Simpson et al. | |
| 4,950,059 A | 8/1990 | Roberts | |
| 4,975,625 A | 12/1990 | Lynch et al. | |
| 4,978,891 A | 12/1990 | Ury | |
| 5,039,903 A | 8/1991 | Farrall | |

(Continued)

FOREIGN PATENT DOCUMENTS

JP    8148127    6/1996

(Continued)

OTHER PUBLICATIONS

"Chapter 4—Cavity Resonators, Army Technical Manual, TM 11-673—Generation and Transmission of Microwave Energy", (Jun. 1953), 12 pgs.

(Continued)

*Primary Examiner* — Vibol Tan
(74) *Attorney, Agent, or Firm* — Schwegman Lundberg & Woessner, P.A.

(57) ABSTRACT

An electrodeless plasma lamp and a method of generating light are provided. The plasma lamp may comprise a power source to provide radio frequency (RF) power and a lamp body to receive the RF power. The lamp body may include a dielectric material having a relative permittivity greater than 2. A bulb is provided that contains a fill that forms a light emitting plasma when the RF power is coupled to the fill. Collection optics is provided to direct the light along an optical path to an aperture, wherein the optical path includes at least one reflective surface and at least two refractive surfaces.

21 Claims, 7 Drawing Sheets

U.S. PATENT DOCUMENTS

| | | | |
|---|---|---|---|
| 5,070,277 A | 12/1991 | Lapatovich | |
| 5,072,157 A | 12/1991 | Greb et al. | |
| 5,086,258 A | 2/1992 | Mucklejohn et al. | |
| 5,361,274 A | 11/1994 | Simpson et al. | |
| 5,438,242 A | 8/1995 | Simpson | |
| 5,448,135 A | 9/1995 | Simpson | |
| 5,498,937 A | 3/1996 | Korber et al. | |
| 5,525,865 A | 6/1996 | Simpson | |
| 5,594,303 A | 1/1997 | Simpson et al. | |
| 5,786,667 A | 7/1998 | Simpson et al. | |
| 5,894,195 A * | 4/1999 | McDermott | 313/512 |
| 5,894,196 A * | 4/1999 | McDermott | 313/512 |
| 5,899,267 A * | 5/1999 | Kroetsch et al. | 165/173 |
| 5,910,710 A | 6/1999 | Simpson | |
| 5,910,754 A | 6/1999 | Simpson et al. | |
| 5,923,116 A | 7/1999 | Mercer et al. | |
| 6,020,800 A | 2/2000 | Arakawa et al. | |
| 6,031,333 A | 2/2000 | Simpson | |
| 6,049,170 A | 4/2000 | Hochi et al. | |
| 6,137,237 A | 10/2000 | MacLennan et al. | |
| 6,246,160 B1 | 6/2001 | MacLennan et al. | |
| 6,252,346 B1 | 6/2001 | Turner et al. | |
| 6,265,813 B1 | 7/2001 | Knox et al. | |
| 6,313,587 B1 | 11/2001 | MacLennan et al. | |
| 6,424,099 B1 | 7/2002 | Kirkpatrick et al. | |
| 6,566,817 B2 | 5/2003 | Lapatovich | |
| 6,617,806 B2 | 9/2003 | Kirkpatrick et al. | |
| 6,666,739 B2 | 12/2003 | Pothoven et al. | |
| 6,737,809 B2 * | 5/2004 | Espiau et al. | 315/39 |
| 6,856,092 B2 | 2/2005 | Pothoven et al. | |
| 6,922,021 B2 * | 7/2005 | Espiau et al. | 315/248 |
| 7,034,464 B1 | 4/2006 | Izadian et al. | |
| 7,291,985 B2 | 11/2007 | Espiau et al. | |
| 7,348,732 B2 | 3/2008 | Espiau et al. | |
| 7,358,678 B2 | 4/2008 | Espiau et al. | |
| 7,362,054 B2 | 4/2008 | Espiau et al. | |
| 7,362,055 B2 | 4/2008 | Espiau et al. | |
| 7,362,056 B2 | 4/2008 | Espiau et al. | |
| 7,372,209 B2 | 5/2008 | Espiau et al. | |
| 7,391,158 B2 | 6/2008 | Espiau et al. | |
| 7,429,818 B2 | 9/2008 | Chang et al. | |
| 2001/0035720 A1 | 11/2001 | Guthrie et al. | |
| 2005/0212456 A1 | 9/2005 | Espiau et al. | |
| 2005/0286263 A1 | 12/2005 | Champion et al. | |
| 2006/0250090 A9 | 11/2006 | Guthrie et al. | |
| 2007/0109069 A1 | 5/2007 | Espiau et al. | |
| 2007/0217732 A1 | 9/2007 | Chang et al. | |
| 2007/0236127 A1 | 10/2007 | DeVincentis et al. | |
| 2007/0241688 A1 | 10/2007 | DeVincentis et al. | |
| 2007/0252532 A1 | 11/2007 | DeVincentis et al. | |
| 2008/0054813 A1 | 3/2008 | Espiau et al. | |
| 2008/0211971 A1 | 9/2008 | Pradhan | |

FOREIGN PATENT DOCUMENTS

| | | |
|---|---|---|
| JP | 2001266803 A | 9/2001 |
| JP | 2003249197 A | 9/2003 |
| KR | 1020050018587 A | 2/2005 |
| WO | WO-2006070190 A1 | 7/2006 |
| WO | WO-2006129102 A2 | 12/2006 |
| WO | WO-2007138276 A2 | 12/2007 |

OTHER PUBLICATIONS

"Chapter 6.3—Rectangular Waveguide Cavities", in: Microwave Engineering, Pozar, D. M., Editor (John Wiley & Sons, Inc.), (Jul. 1997), pp. 313-318.

Espiau, F. M., et al., "Plasma Lamp", U.S. Appl. No. 60/022,028, filed Jul. 31, 2000, 28 pgs.

Guthrie, C., et al., "A Corregated Wave-Guide Used for the Excitation of an Electrode-Less Metal Halide Plasma Lamp Incorporating a Solid Dielectric Material", U.S. Appl. No. 60/224,060, filed Aug. 9, 2000, 9 pgs.

Guthrie, C., et al., "A Method for Connecting the Antenna on a Printed Wiring Board to a Wave-Guide in a Light Source in Which an Electrode-Less Lamp is Built Into the Wave-Guide Structure", U.S. Appl. No. 60/224,061, filed Aug. 9, 2000, 9 pgs.

Guthrie, C., "D.R.I. Drawings—Wave Guide Lamp Concept 8 (WGC008); Wave Guide Lamp Concept 9 (WGC009); and Wave Guide Lamp Concept 10 (WGC010)", Guthrie Exhibit 2173, Board of Patent Appeals and Interferences (Interference No. 105,393), (Jun. 28, 2000), 3 pgs.

Guthrie, Charles, et al., "Electrodeless Incandescent Bulb", U.S. Appl. No. 60/639,857, filed Dec. 27, 2004, 16 pgs.

Guthrie, Charles, et al., "Lamp", U.S. Appl. No. 60/687,280, filed Jun. 3, 2005, 17 pgs.

Inventors Not Listed, "Lamp", International Application Serial No. PCT_GB2007_001935, International filing date May 24, 2007, GB Application Serial No. 0610580.3, filed May 30, 2006.

Izadian, J. S., et al., "Generating Light From Electromagnetic Energy", U.S. Appl. No. 60/337,057, filed Nov. 6, 2001, 120 pgs.

Pozar, D. M., "Section 5.8, Tapered Lines", In: Microwave Engineering, 3rd Edition, 2005 (John Wiley & Sons, Inc.), (2005), 9 pgs.

Pozar, D. M., "Section 6.4, Circular Waveguide Cavities", in: Microwave Engineering, 3rd Edition, 2005 (John Wiley & Sons, Inc.), (2005), 8 pgs.

Prior, G., et al., "Quartz Bulb Enclosed in a Wave-Guide", U.S. Appl. No. 60/234,415, filed Sep. 21, 2000, 5 pgs.

Prior, G., et al., "Wave-Guide Used for the Excitation of an Electrode-Less Metal Halide Plasma Lamp Incorporating a Solid Dielectric Material", U.S. Appl. No. 60/224,059, filed Aug. 9, 2000, 7 pgs.

Prior, G., et al., "Wave-Guide Used for the Excitation of an Electrode-Less Metal Halide Plasma Lamp Incorporating a Solid Dielectric Material", U.S. Appl. No. 60/224,298, filed Aug. 10, 2000, 5 pgs.

Sandberg, E., et al., "A Mechanical Means of Sealing the Window to an Electrode-Less Metal Halide Bulb That Is Integrated Into a Waveguide", U.S. Appl. No. 60/262,536, filed Jan. 17, 2001, 6 pgs.

Sandberg, E., "An Improved Drive Circuit for an Electrode-Less Plasma Lamp That is Embedded in a Waveguide", U.S. Appl. No. 60/241,198, filed Oct. 17, 2000, 7 pgs.

Sandberg, E., "Light Source for Use in Microdisplay Based Light Engines", U.S. Appl. No. 60/192,731, filed Mar. 27, 2000, 31 pgs.

Smoler, D., "E-Mail to C. Guthrie re: Ridged Waveguide Ideas", (Jun. 27, 2000), 2 pgs.

Wharmby, D. O., "Chapter 11—Electrodeless Lamps", In: Lamps & Lighting, 4th Edition, 1997 (Arnold & John Wiley & Sons, Inc., (1997), 13 pgs.

Wharmby, D. O., "Electrodeless Lamps for Lighting: A Review", IEEE Proceedings-A, vol. 140 (6), (Nov. 1993), 9 pgs.

Wilson, D., et al., "Use of a Coating to Prevent the Reduction of Ceramic to Elemental Metal in the Bulb of a Wave-Guide Lamp", U.S. Appl. No. 60/224,866, filed Aug. 11, 2000, 3 pgs.

Wilson, D., et al., "Electrode-Less Metal Halide Plasma Lamp With Integrated Electronics", U.S. Appl. No. 60/224,290, filed Aug. 10, 2000, 9 pgs.

Wilson, D., et al., "High Temperature, Low Cost Window Sealing Technique for Plasma Lamps", U.S. Appl. No. 60/224,291, filed Aug. 10, 2000, 5 pgs.

Wilson, D., et al., "Light Source Consisting of an Electrode-Less Metal Halide Plasma Bulb That Is Integrated Into a Wave-Guide", U.S. Appl. No. 60/224,289, filed Aug. 10, 2000, 6 pgs.

Wilson, D., et al., "Means to Reduce EMI in a Wave-Guide", U.S. Appl. No. 60/224,503, filed Aug. 10, 2000, 20 pgs.

Wilson, D., et al., "R.F. Wave-Guide Into Which an Insert of a Hermetric Material That Has Been Either Molded or Plasma Deposited", U.S. Appl. No. 60/224,257, filed Aug. 10, 2000, 5 pgs.

Wilson, D., et al., "Use of a Heat Sink in a Plasma Light Source (Located Between a Wave Guide That Incorporates the Bulb and the Drive Electronics)", U.S. Appl. No. 60/224,961, filed Aug. 11, 2000, 6 pgs.

Wilson, D., et al., "Use of a Heat Sink in a Plasma Light Source (Located Externally and Surrounding the Lamp Assembly)", U.S. Appl. No. 60/224,617, filed Aug. 11, 2000, 20 pgs.

* cited by examiner

LIGHT COLLECTION SYSTEM FOR AN ELECTRODELESS RF PLASMA LAMP

CLAIM OF PRIORITY

The present application claims the benefit under 35 U.S.C. 119(e) of U.S. Provisional Patent Application Ser. No. 61/104,021, filed Oct. 9, 2008, which is incorporated herein by reference in its entirety.

FIELD

The field of the present subject matter relates to systems and methods for the collection of light from a light source. Example embodiments relate to systems and methods for collecting light from an electrodeless plasma lamp that emits light into a hemisphere.

BACKGROUND

Electrodeless plasma lamps may be used to provide light sources. Because electrodes are not used, they may have longer useful lifetimes than other lamps. In many lighting applications it may be important to collect as much light as possible into a given etendue (into a given area with a given angular distribution).

BRIEF DESCRIPTION OF THE DRAWINGS

Embodiments are illustrated by way of example, and not limitation, in the figures of the accompanying drawings, in which like references indicate similar elements unless otherwise indicated. In the drawings.

DETAILED DESCRIPTION

Background

In most applications of High Intensity Discharge (HID) plasma lamps light emitted from a plasma arc has to be collected and focused into an aperture of a certain area and with a certain angular extent. These applications include, but are not limited to, projection displays where the light has to be focused and homogenized for illumination of a micro-display, technical applications like microscope illumination or endoscopes where the light has to be focused into an optical fiber, or theatrical and entertainment applications like spotlights and moving heads, where the light has to uniformly illuminate an aperture. Typical HID lamps with electrodes emit into a sphere with most of the light in the direction perpendicular to the electrodes.

Figure 1A:
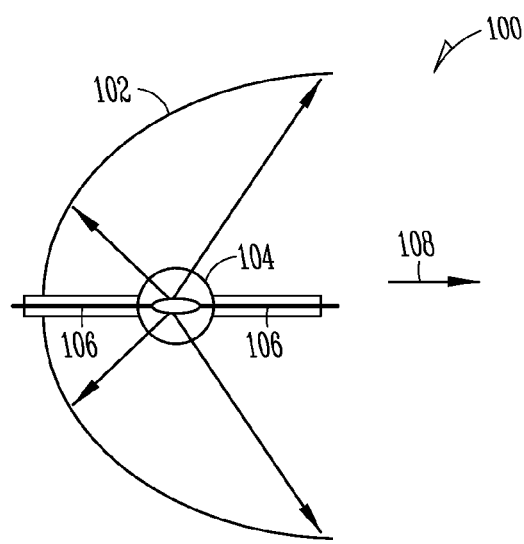
FIG. 1A shows a High Intensity Discharge (HID) lamp with electrodes wherein light is emitted primarily in a direction perpendicular to the electrodes and therefore efficiently collected by a reflector.

FIG. 1A shows an example HID lamp 100 including a reflector 102 to reflect light from a bulb 104 including electrodes 106. Light emitted in a forward direction 108 is actually blocked by the electrodes 106 but the reflector 102 can relatively efficiently collect the majority of the light emitted by the bulb 104. Thus a single reflector may provide efficient light collection optics for conventional electroded HID lamps such as the HID lamp 100.

Figure 1B:
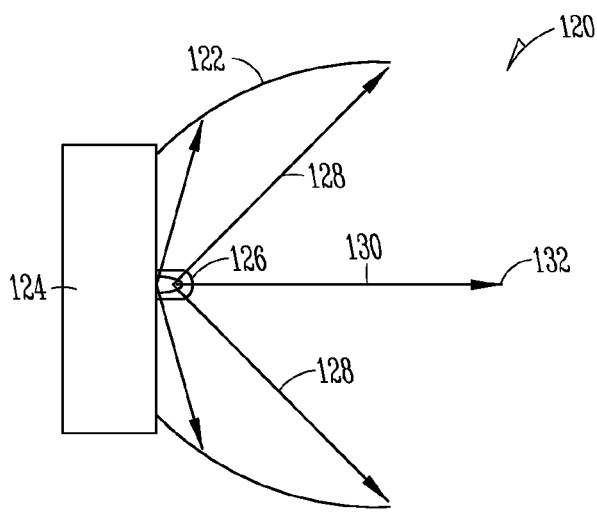
FIG. 1B shows an electrodeless plasma lamp emitting light primarily in a forward direction and therefore not efficiently collected by a reflector.
Figure 1C:
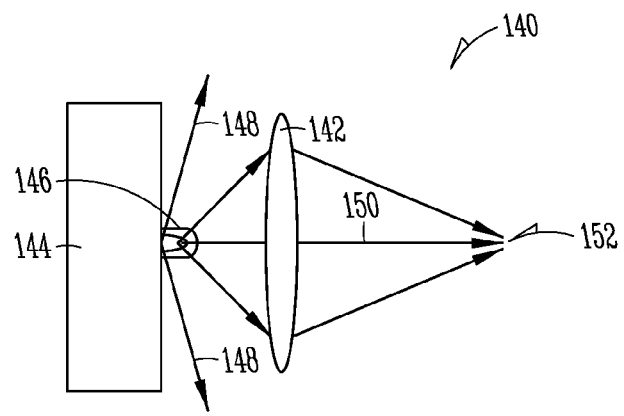
FIG. 1C shows an electrodeless plasma lamp emitting light primarily in the forward direction using a lens system to collect the light.

FIGS. 1B and 1C show examples of electrodeless plasma lamps 120, 140. The plasma lamp 120 includes a reflector 122 to reflect light, whereas the plasma lamp 140 includes a lens or refractor 142 to refract light. The plasma lamp 120 includes a lamp body 124 to couple power to a bulb 126 that includes a light emitting plasma. Likewise, the plasma lamp 140 includes a lamp body 144 to couple power to a bulb 146 that includes a light emitting plasma. However, light collection in the electrodeless plasma lamps 120 and 140 may not be efficient. For example, in the electrodes plasma lamp 120 (see FIG. 1B) light rays 128 emitted at certain angles relative to an optical axis 130 of the reflector 122 may not be collected at an aperture at a focal point 132. Likewise, in the electrodeless plasma lamp 140 (see FIG. 1C) light rays 148 emitted at certain angles relative to an optical axis 150 of the lens 142 may not be collected at an aperture at a focal point 152.

Example Embodiments

Figure 2A:
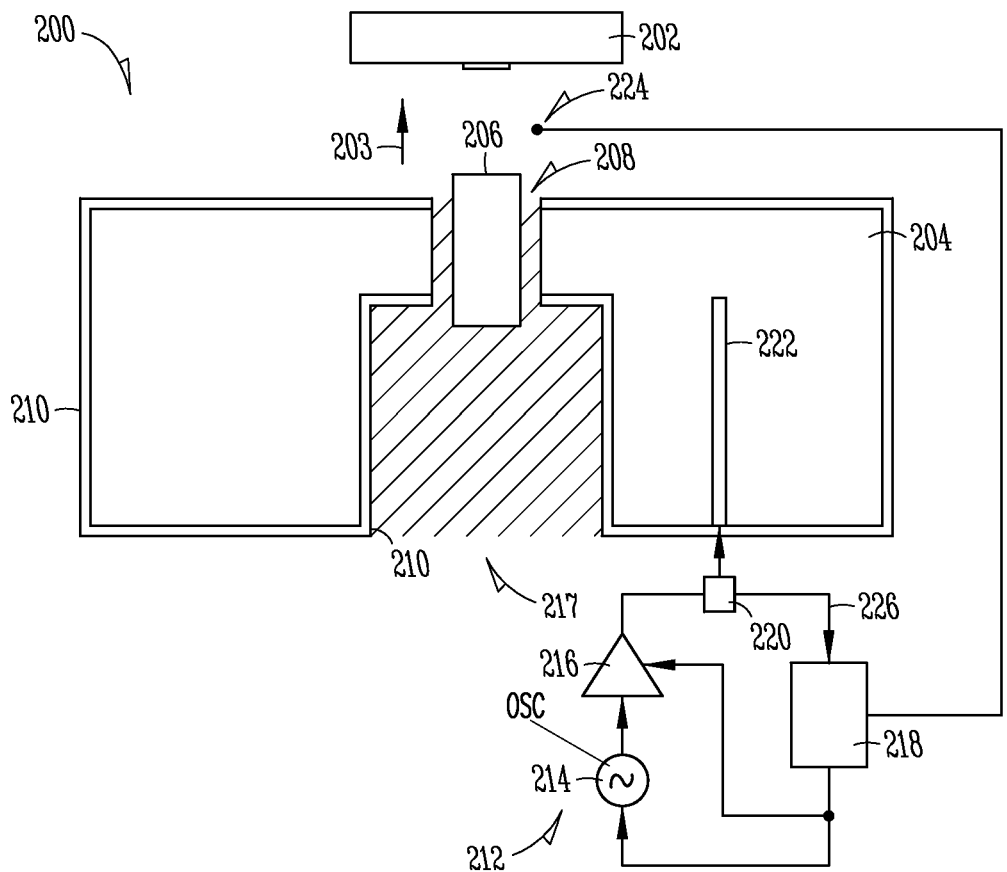
FIG. 2A shows an electrodeless plasma lamp including collection optics in accordance with an example embodiment.

FIG. 2A shows an electrodeless plasma lamp 200 in accordance with an example embodiment. The plasma lamp 200 includes collection optics 202, examples of which are shown in FIGS. 2B, 3, 4, 5A and B, 6A and B, and 7A-7C.

In an example embodiment, the plasma lamp 200 is a Radio Frequency (RF) plasma lamp that emits light into a hemisphere with a substantial amount of light emitted into a forward direction 203. The plasma lamp 200 may include a solid dielectric lamp body 204 having a relative permittivity (also referred to as dielectric constant) greater than 2. A bulb 206 may be positioned in an opening 208 in the lamp body 204 and positioned along an optical axis of the collection optics 202. In an example embodiment, the bulb 206 is elongate and has an axis of rotational symmetry that coincides with an optical axis of the collection optics. At least one end of the bulb 206 may protrude outside of the lamp body 204. In the example plasma lamp 200 shown in FIG. 2A, both ends of the bulb 206 protrude from the lamp body 204.

An outer surface 210 of the lamp body 204 may be coated with an electrically conductive coating, such as a silver paint. RF power may be provided to the lamp body 204 from a drive circuit 212, which may include an oscillator 214 and amplifier 216. The radio frequency power may be provided at about a resonant frequency for the lamp body 204 and excite a light emitting plasma in the bulb 206. The plasma lamp 200 may include a reflecting surface on a back portion of the bulb 206, such as packed ceramic powder 217, a mirror, or a thin-film specular reflecting coating. The reflecting surface may cause the plasma lamp 200 to emit light into a hemisphere with a substantial amount of light emitted in the forward direction 203. The plasma lamp 200 is shown by way of example to further include a microprocessor 218, a coupler 220 and a drive probe 222 that provides RF power to the lamp body 204.

In an example embodiment, the lamp body 204 has a cylindrical outer surface. However, it is to be noted that other symmetric shapes, such as square or rectangular prisms, and asymmetric shapes may be used.

As shown in FIG. 2A, the oscillator 214 may provide power through the amplifier 216 to the drive probe 222. In an example embodiment, the drive probe 222 is embedded in the lamp body 204 which may be a solid waveguide body. The microprocessor 218 may be used to control the frequency and power level provided to the drive probe 222. The microprocessor 218 may cause power to be provided at a first frequency and power level for initial ignition, a second frequency and power level for startup after initial ignition, and a third frequency and power level when the plasma lamp 200 reaches steady state operation. Each step in the startup process may continue for a predetermined period of time as determined by the microprocessor 204 or may be based on plasma lamp conditions such as a signal from an optional sensor 224 or on reflected power from the lamp body 204 and the drive probe 222. Reflected power may be provided back to the microprocessor 218 by a coupler 220 as shown at 226. It is to be noted that the plasma lamp 200 may include one or more further probes, for example, to obtain feedback from the lamp body 204 and may use a different power circuit.

Example electrodeless plasma lamps that may be used in combination with the optics described herein are described in U.S. Patent Application Publication No. 20080054813, entitled "Plasma Lamp With Conductive Material Positioned Relative To RF Feed"; U.S. Patent Application Publication No. 20070252532 entitled "Plasma Lamp With Stable Feedback Amplification And Method Therefor"; U.S. Patent Application Publication No. 20070241688 entitled "Plasma Lamp With Conductive Material Positioned Relative To RF Feed"; U.S. Patent Application Publication No. 20070236127 entitled "Plasma Lamp Using A Shaped Waveguide Body"; and U.S. Patent Application Publication No. 20070217732 entitled "Plasma Lamp And Methods Using A Waveguide Body And Protruding Bulb"; each of which is hereby incorporated herein by reference in its entirety. These are examples lamps only and other embodiments may be used with other lamps, including for example, inductively coupled electrodeless plasma lamps or capacitively coupled electrodeless plasma lamps.

In the electrodeless plasma lamp 120 (see FIG. 1B) with a substantial amount of light emitted into the forward direction 203, a single reflective element (e.g., the reflector 102) is not very effective as it only collects the light emitted into higher angles. In the plasma lamp 140 a lens system is used to collect the light (see FIG. 1C). However, the lens system only collects light emitted into the forward direction close to the optical axis 150. However, in the example embodiments shown in FIGS. 2A, 2B, 3, 4, 5A and 5B, 6A and B, and 7A-7C collection optics including both reflective and refractive elements are provided. For example, for efficient collection of the light emitted into the hemisphere a refractive element, like a lens, is combined with a reflective element where the refractive element collects the light emitted close to the optical axis and the reflective element collects the light emitted into higher angles relative to the optical axis.

Figure 2B:
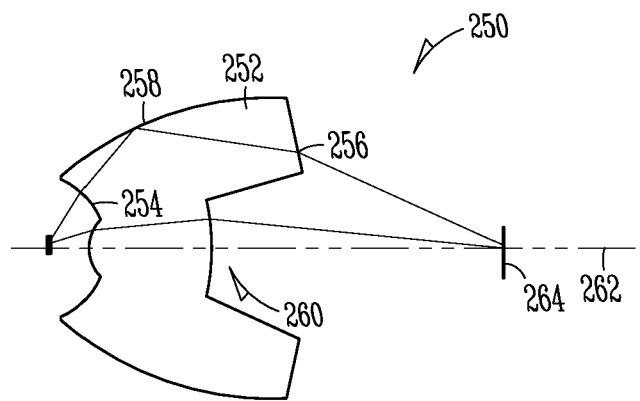
FIG. 2B shows collection optics, in accordance with an example embodiment, comprising a single optical element that uses two refractive surfaces and one reflective surface for collecting light efficiently from an electrodeless plasma lamp.
Figure 3:
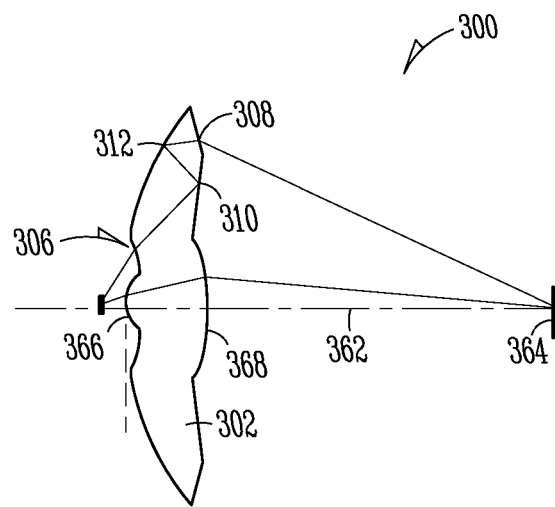
FIG. 3 shows collection optics, in accordance with an example embodiment, comprising a single optical element that uses two refractive and two reflective surfaces for collecting light efficiently from an electrodeless plasma lamp.

Referring in particular to FIGS. 2B and 3, examples of collection optics 250, 300 for collecting light emitted by the bulb 206 of the example plasma lamp 200 are shown. The collection optics 250 (see FIG. 2B) includes a single optical element 252 that uses two refractive surfaces 254, 256 and one reflective surface 258 for collecting light efficiently from the bulb 206. The collection optics 250 is shaped and dimensioned so that light rays at low angles relative to the optical axis, and light rays at higher angles relative to the optical axis are collected by the collection optics and directed to an aperture. The collection optics 300 (see FIG. 3) includes a single optical element 302 that uses two refractive surfaces 306, 308 and two reflective surfaces 310, 312 for collecting light efficiently from the bulb 206 of the example plasma lamp 200.

In an example embodiment, the collections optics includes a lens system that uses two (e.g., for a nearly collimated beam) and three lenses (e.g., for a focused beam) to collect the light emitted by the bulb 206 into a given area or aperture. In an example embodiment, the angular range that can be practically captured by the lenses is limited to <60 degrees from the optical axis due to the limited size of the lenses. Capturing a larger angular range may increase the diameter and thickness of the lenses and therefore the overall system size, weight and cost. The lenses may also image the bulb 206 onto the collection area. To increase collection efficiency extending the angular range and using non-imaging optics may be beneficial.

The collection optics 202 of the example plasma lamp 200 can be a single optical element or multiple optical elements designed to collect light emitted from the bulb 206 close to the theoretical limit given by the lumen/etendue curve. Unlike a lens system, the light collecting system may be a non-imaging optical system. Example embodiments (e.g., the collection optics 250 and 300) combine refractive and reflective elements to efficiently collect the light from the bulb 206 of the plasma lamp 200.

The collection optics 250 of FIG. 2 is shown to include the single optical element 252 that integrates a lens with a reflector. The collection optics 250 includes a refractive portion combined with a reflective portion, wherein the refractive portion directs light rays emitted close to an optical axis of the collection optics to the aperture, and the reflective portion directs the light rays emitted into higher angles relative to the optical axis to the aperture. The refractive portion only refracts the light rays in the optical path and the light rays are both refracted and reflected by the outer or reflective portion. For example, as shown in FIG. 2B, the light rays in the outer portion may be refracted twice and reflected once. However, as shown by way of example in FIG. 3, the light rays in the outer portion may also be refracted twice and reflected twice. The collection optics 250 and 300 may have an axis of rotational symmetry about an optical axis.

The optical element 252 (see FIG. 2B), may be used in connection with an electrodeless RF lamp with a substantial amount of light emitted into the forward direction such as the examples described above and in the U.S. Patent Application Publications referenced above. A central portion 260 of the optical element 252 captures light rays emitted into a cone along an optical axis 262 and focuses this light onto a collection area or aperture 264. In an instrument application this collection area 264 could be a fiber optic cable or the like. Light rays outside this cone are first refracted (e.g., see optical surface 254) and then reflected at the optical surface 258. To reduce cost and avoid needing a reflective coating on the optical surface 258, it may be advantageous to shape and dimension the optical element 252 so that total internal reflection (TIR) takes place at the optical surface. At an optical surface 256 the rays are again refracted and focused onto the collection area or aperture 264. In an example embodiment, the optical surface 258 can be of conic shape. In an example embodiment, the angular range captured by this optical element 252 can be extended to ±80° without increasing the system size as compared to a lens system.

Ray-tracing calculations using a design as shown in FIG. 2, where the inner part forms an aspheric lens (see central portion 260), and the reflective surface (see optical surface 258) is of elliptical shape have shown that the performance exceeds the performance of a three lens system that has been optimized for best collection efficiency.

It should be noted that the collection optics 252 does not need to be rotationally symmetric around the optical axis 262. In fact, for projection display applications where light has to be coupled into a rectangular area, the shape of the optical surfaces 254, 256, 258 can be optimized in three-dimensions in such a way that best coupling is achieved. Similarly if the source of light (the bulb 206) itself is not rotationally symmetric, but the target area or aperture 264 is, as for example with an optical fiber, an optical element that is not rotationally symmetric can be designed to achieve best light collection.

The collection optics 300 of FIG. 3 also includes a single optical element 302 that integrates a lens with a reflector. The single optical element 302 collects light from the electrodeless plasma lamp 200. Center rays are collected by two refractive surfaces 366 and 368 that act as an aspheric lens whereas the higher angle rays are refracted by a first optical surface 306 and than undergo two reflections at second and third optical surfaces 310, 312 before being refracted again at the fourth optical surface 308. The two reflections can be achieved by total internal reflection or with a mirror coating on a glass surface of the collection optics 300. The example collection optics 300 in FIG. 3 may decrease a thickness of the optical element 302 as compared to the example optical element 252 shown in FIG. 2B, but increases the diameter of the optical element 302 as compared to the optical element 252.

For applications where the target collection aperture 262, 364 is much larger than the source (see bulb 206) the collection optics for light collection should be increased in size as well. In this case, a single element as shown by the example optical elements 252, 302 may be difficult and expensive to manufacture and a two-piece design may be more advantageous.

Figure 4:
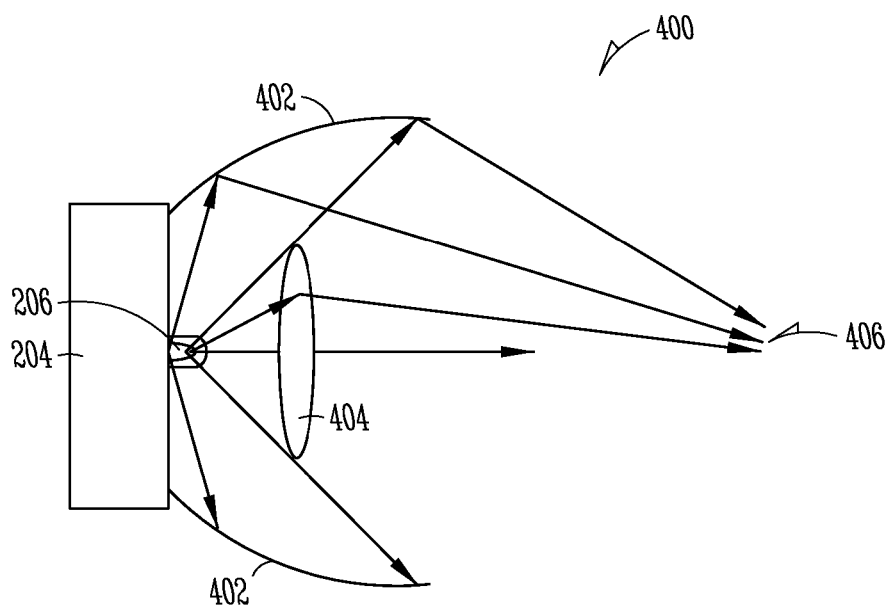
FIG. 4 shows collection optics, in accordance with an example embodiment, comprising a reflector and a lens nested inside the reflector for collecting light efficiently from an electrodeless plasma lamp.

FIG. 4 shows collection optics 400 including a reflector 402 and a refractor or lens 404 nested inside the reflector 402 for collecting light efficiently from a bulb of an electrodeless plasma lamp, for example, the electrodeless plasma lamp 200 of FIG. 2A.

The optical system 400 is an example of a two-piece or composite optical arrangement. In the two-piece optical arrangement, the reflective portion and the refractive portion are physically separate components. The lens 404 is shown by way of example to be an aspheric lens nested inside the reflector 402 and collects the center rays and directs them towards an aperture 406. The reflector 402 is configured to collect the light from the higher angles relative to the optical axis and reflect it towards the aperture 406.

Figure 5A:
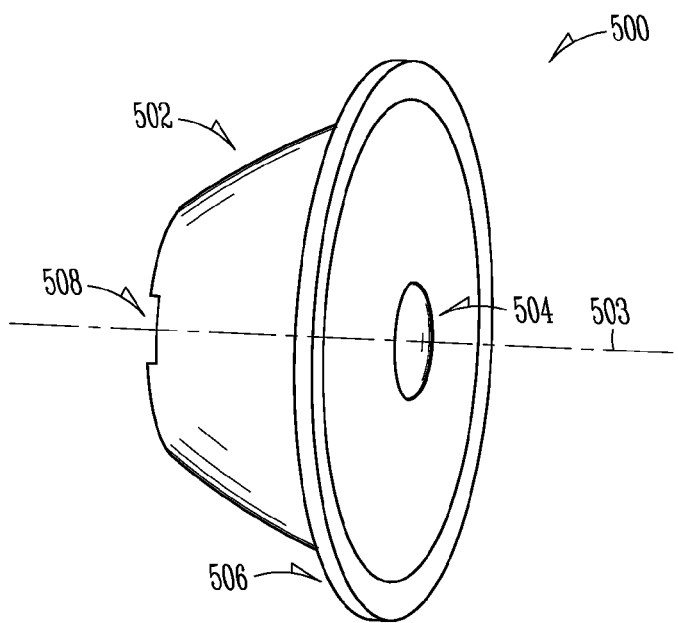
FIGS. 5A and 5B show a further example embodiment of collection optics to direct light along an optical path to an aperture, wherein the optical path includes at least one reflective surface and at least two refractive surfaces.
Figure 5B:
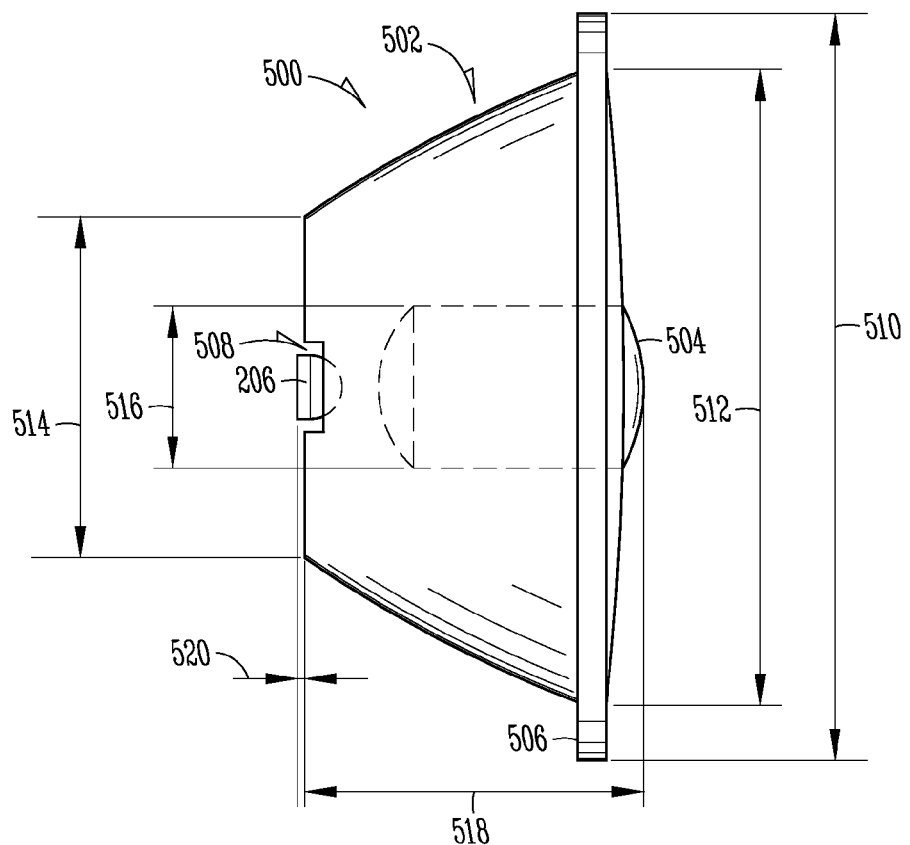

FIGS. 5A-5B show a further example embodiment of collection optics 500 to direct light along an optical path to an aperture, wherein the optical path includes at least one reflective surface and at least two refractive surfaces. The collection optics 500 has a faceted total internal reflective (TIR) surface 502 to direct light rays at higher angles relative to an optical axis 503 towards an aperture. A center lens 504 is provided to direct light at lower angles to the aperture. A mounting flange 506 is provided to mount the optical arrangement relative to a lamp body (e.g., the lamp body 204 of the plasma lamp 200 shown in FIG. 2A) to collect light emitted from a light source (e.g., the bulb 206). A channel (e.g., a cooling slit 508) is provided to allow cooling of the light source. In an example embodiment, a 3 mm×10 mm cooling channel is provided.

As shown in FIG. 5B, the center lens 504 is circular cylindrical and shaped and dimensioned to refract light rays and direct them at an aperture provided proximate a focal point of the collection optics 500. In an example embodiment, the collection optics 500 is rotationally symmetrical about its optical axis. The flange 506 may have an external diameter 510 of about 82 mm and an internal diameter 512 of about 72 mm. A side of the collection optics 500 mounted proximate a lamp body (e.g., the lamp body 204) has a diameter 514 of about 38.2 mm and the collection optics 500 has a height 518 (measured to an exposed end of the lens 504) of about 37 mm. The lens 504 may have a diameter 516 of about 18.8 mm. The collection optics 500 may stand proud of the lamp body 204 by about 1 mm (see arrows 520). In the example collection optics 500, the center lens 504 may direct light rays from about 0 degrees to about 31 degrees (or any range subsumed therein) to an aperture. The TIR surface 502 may direct light rays from about 32 degrees to about 85 degrees (or any range subsumed therein) to the aperture. It is however to be noted that the dimensions may change dependent upon, for example, the size of the bulb 206.

When the plasma lamp 200 includes a physical template (e.g., GOBO ("GOes Before Optics") template used in theatrical lighting) to control the shape of emitted light, a distance between the template and the collection optics 500 may be about 92 mm.

Figure 6A:
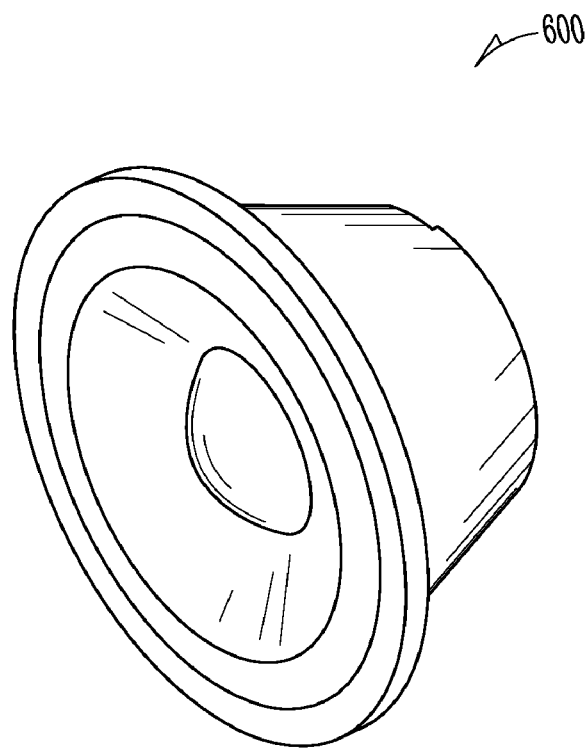
FIGS. 6A and B show isometric views of a further example embodiment of collection optics to direct light along an optical path to an aperture, wherein the optical path includes at least one reflective surface and at least two refractive surfaces.
Figure 6B:
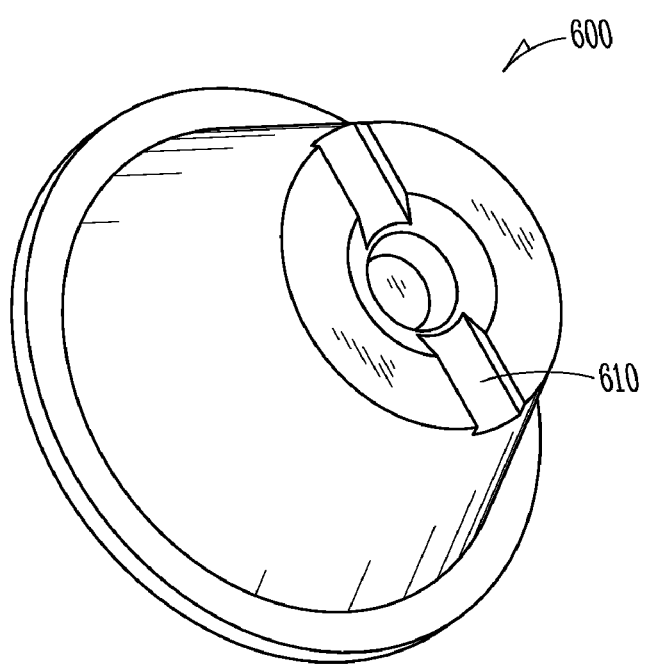
Figure 7C:
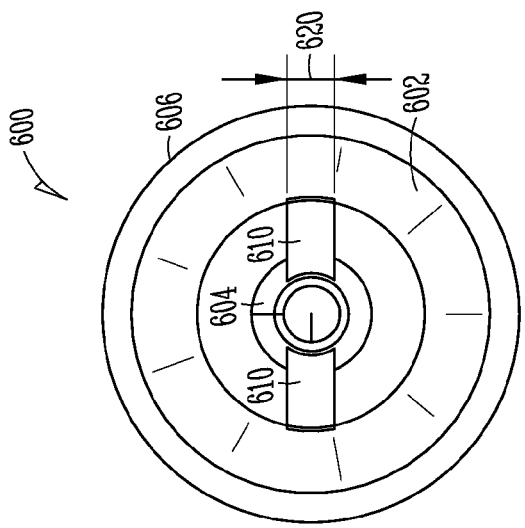
FIG. 7C shows a rear view of the collection optics of FIGS. 6A and 6B.
Figure 7B:
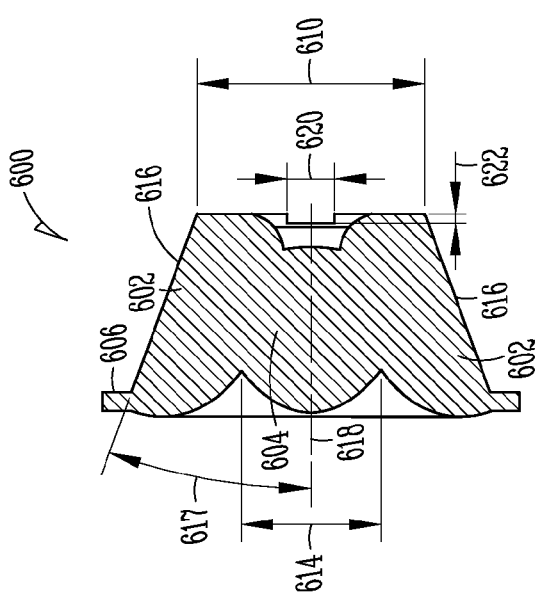
FIG. 7B shows a sectional view of the collection optics of FIGS. 6A and 6B taken along lines A-A in FIG. 7A.
Figure 7A:
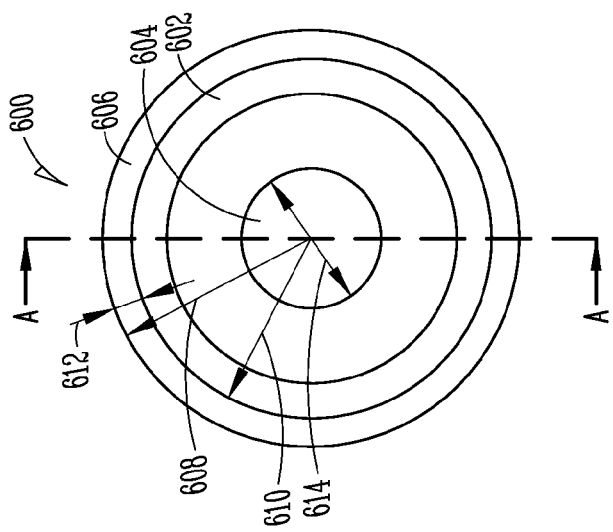
FIG. 7A shows a front view of the collection optics of FIGS. 6A and 6B.

FIGS. 6A and B show isometric views of a further example embodiment of collection optics 600 to direct light along an optical path to an aperture. The optical path includes at least one reflective surface and at least two refractive surfaces. FIG. 7A shows a front view of the collection optics of FIGS. 6A and 6B. FIG. 7B shows a sectional view of the collection optics of FIGS. 6A and 6B taken along lines A-A in FIG. 7A. FIG. 7C shows a rear view of the collection optics of FIGS. 6A and 6B.

The collection optics 600 includes a reflective portion 602 combined (e.g., integrally formed) with a refractive portion 604. The refractive portion 604 directs light rays emitted close to an optical axis of the collection optics to an aperture, and the reflective portion 602 directs the light rays emitted into higher angles relative to the optical axis to the aperture. As can be seen in FIG. 7A, the collection optics 600 is rotationally symmetrical about its optical axis. A mounting arrangement in the example form of a flange 606 has an outer diameter 608 of about 88 mm and a diameter 610 of about 48.10 mm at its base. The flange 606 may have a thickness 612 of about 4 mm. The refractive portion 604 may have a diameter 614 of about 29.5 mm. A reflective surface 616 of the reflective portion 602 is angled (see arrow 617) at about 22.11 degrees relative to an optical axis 618. The collection optics 600 is also shown to include a cooling channel 610 to facilitate cooling of the bulb 206. The cooling channel is shown by way of example to have a width 620 of about 10 mm (see FIG. 7C) and a depth 622 of about 2 mm (see FIG. 7B).

In an example embodiment, the collection optics 202, 250, 300, 400, 500, 600 may comprise optical glass, examples including B270, ZK10, BaK7, or the like available from ChinaOpticsNet (the USA offices of which are located in Orlando Fla. and optical glass available from their website ChinaOpticsNet.com).

Figure 8:
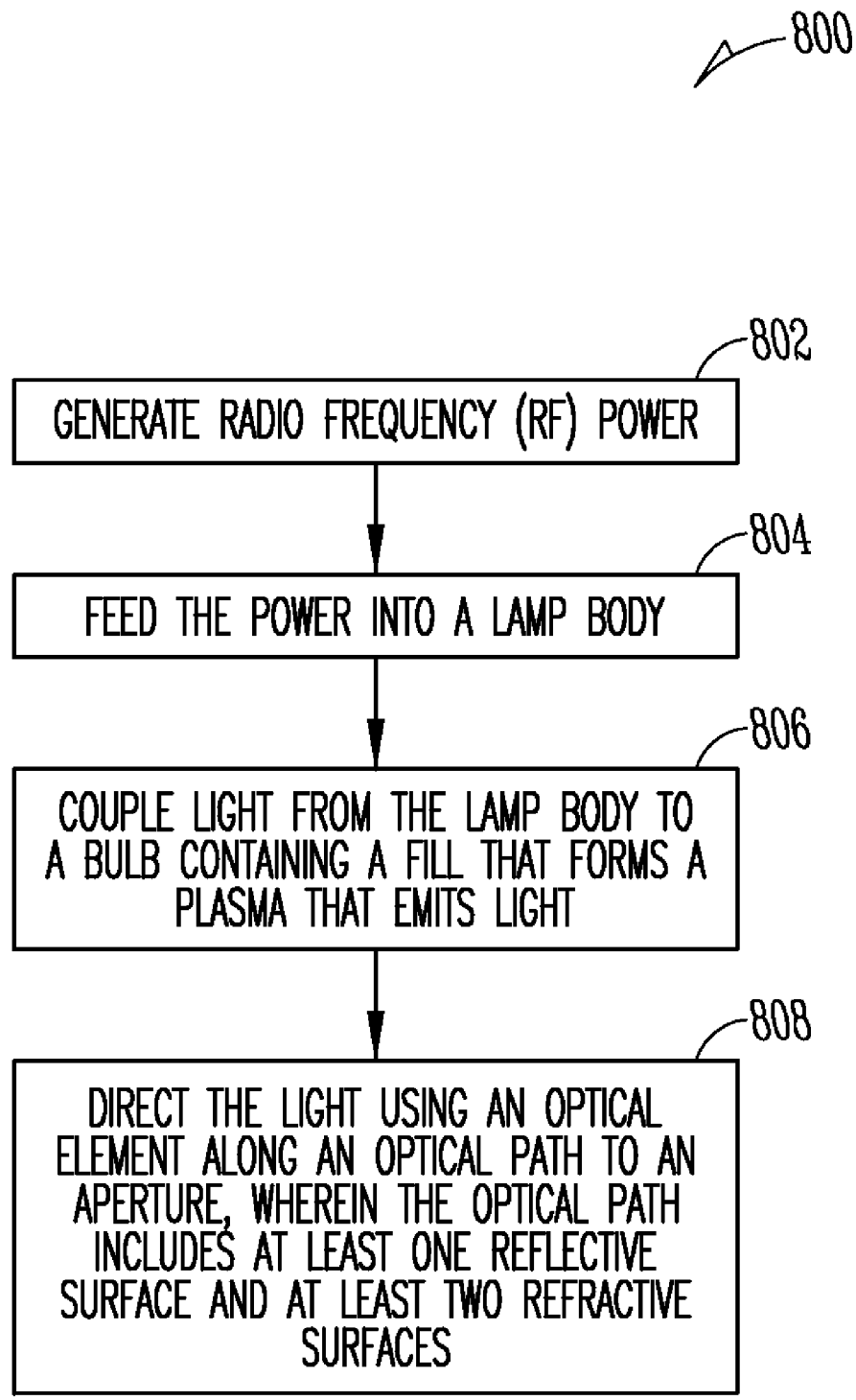
FIG. 8 show an example method of collecting light from a light source of a plasma lamp.

FIG. 8 show an example method 800 of collecting light from a light source of a plasma lamp. The method 800 may be implemented by the plasma lamp 200 and, accordingly, is described by way of example with reference thereto.

As shown at block 802, the method 800 may comprise generating radio frequency (RF) power using a power source and feeding the power into a lamp body 204 including a dielectric material with a relative permittivity greater than 2 (see block 804). Light from the lamp body 204 may be coupled to the bulb 206 containing a fill that forms a plasma that emits light (see block 806). As shown at block 808, the method 600 may include directing the light using an optical element (e.g., the collection optics 250, 300, 400) along an optical path to an aperture, wherein the optical path includes at least one reflective surface and at least two refractive surfaces.

What is claimed is:

1. An electrodeless plasma lamp comprising:
  a power source to provide radio frequency (RF) power;
  a lamp body including a dielectric material having a relative permittivity greater than 2, the lamp body to receive the RF power;
  a bulb containing a fill that forms a light emitting plasma when the RF power is coupled to the fill; and
  collection optics to direct the light along an optical path to an aperture, wherein the collection optics includes:
    a central refractive portion where light rays in the optical path are only refracted; and
    an outer portion where light rays in the optical path are refracted and reflected, the light rays exiting the outer portion being refracted twice and reflected once or twice.

2. The plasma lamp of claim 1, wherein the RF power is provided at a resonant frequency for the lamp body.

3. The plasma lamp of claim 1, wherein the refractive portion is combined with a reflective portion, and wherein the refractive portion directs light rays emitted close to an optical axis of the collection optics to the aperture, and the reflective portion directs the light rays emitted into higher angles relative to the optical axis to the aperture.

4. The plasma lamp of claim 1, wherein the collection optics has an axis of rotational symmetry about an optical axis.

5. The plasma lamp of claim 1, wherein the collection optics comprises a reflective portion, the reflective portion and the refractive portion being physically separate components.

6. The plasma lamp of claim 5, wherein the refractive portion is an aspheric lens.

7. The plasma lamp of claim 5, wherein an optical axis of the reflective portion and the optical axis of the refractive portion share common optical axis and the reflective portion and the refractive portion have an axis of rotational symmetry about the common optical axis.

8. The plasma lamp of claim 1, wherein bulb is positioned along an optical axis of the collection optics.

9. The plasma lamp of claim 1, further comprising an opening that extends between a recess and an upper surface of the lamp body, the bulb being located within the opening and extending at least partially into the recess.

10. The plasma lamp of claim 1, wherein at least one end of the bulb protrudes outside of the lamp body.

11. The plasma lamp of claim 1, wherein the bulb is elongate and has an axis of rotational symmetry that coincides with an optical axis of the collection optics.

12. A method of providing light, the method comprising:
  generating radio frequency (RF) power using a power source;
  feeding the power into a lamp body including a dielectric material with a relative permittivity greater than 2;
  coupling light from the lamp body to a bulb containing a fill that forms a plasma that emits light; and
  directing the light using collection optics along an optical path to an aperture, the collection optics being a single optical element comprising central refractive portion and an outer portion;
    only refracting light rays in the optical path of the central refractive portion; and
    refracting and reflecting light rays in the optical path of the outer portion, and wherein the light rays exiting the outer portion are refracted twice, and reflected once or reflected twice.

13. The method of claim 12, wherein the RF power is provided at a resonant frequency for the lamp body.

14. The method of claim 12, wherein the refractive portion is combined with a reflective portion, the method comprising:
  directing light rays emitted close to an optical axis of the collection optics to the aperture using the refractive portion; and
  directing light rays emitted into higher angles relative to the optical axis to the aperture using the reflective portion.

15. The method of claim 12, wherein the collection optics comprises a reflective portion, the reflective portion and the refractive portion being physically separate components.

16. A Plasma lamp comprising:
  means for generating radio frequency (RF) power using a power source;
  means for feeding the power into a lamp body including a dielectric material with a relative permittivity greater than 2;
  means for coupling light from the lamp body to a bulb containing a fill that forms a plasma that emits light; and
  means for directing the light using collection optics along an optical path to an aperture, wherein the collection optics includes:
    a central refractive portion where light rays in the optical path are only refracted; and
    an outer portion where light rays in the optical path are refracted and reflected, and wherein the light rays exiting the outer portion are refracted twice, and reflected once or reflected twice.

17. An electrodeless plasma lamp comprising:
  a power source to provide radio frequency (RF) power;
  a lamp body including a dielectric material having a relative permittivity greater than 2, the lamp body to receive the RF power;
  a bulb containing a fill that forms a light emitting plasma when the RF power is coupled to the fill; and
  collection optics to direct the light along an optical path to an aperture, wherein the collection optics comprises a reflective portion and a refractive portion, the reflective portion and the refractive portion being physically separate components.

18. The plasma lamp of claim 17, wherein the refractive portion is an aspheric lens.

19. The plasma lamp of claim 17, wherein an optical axis of the reflective portion and the optical axis of the refractive portion share common optical axis and the reflective portion and the refractive portion have an axis of rotational symmetry about the common optical axis.

20. A method of providing light, the method comprising:

generating radio frequency (RF) power using a power source;

feeding the power into a lamp body including a dielectric material with a relative permittivity greater than 2;

coupling light from the lamp body to a bulb containing a fill that forms a plasma that emits light; and directing the light using collection optics along an optical path to an aperture, wherein the collection optics comprises a reflective portion and a refractive portion, the reflective portion and the refractive portion being physically separate components.

21. The plasma lamp of claim 20, wherein an optical axis of the reflective portion and the optical axis of the refractive portion share common optical axis and the reflective portion and the refractive portion have an axis of rotational symmetry about the common optical axis.

* * * * *